United States Patent [19]

Low

[11] 4,315,565
[45] Feb. 16, 1982

[54] SCAVENGE PUMP

[76] Inventor: Leonard J. Low, P.O. Box 1927, Sparks, Nev. 89431

[21] Appl. No.: 938,637

[22] Filed: Aug. 31, 1978

[51] Int. Cl.³ ............................................. F16D 13/74
[52] U.S. Cl. .................. 192/113 B; 184/1.5; 417/54; 417/151
[58] Field of Search .............. 192/113 B; 417/76, 151, 417/167, 186, 407, 53, 54; 184/1.5, 6.25, 55 R, 55 A

[56] References Cited

U.S. PATENT DOCUMENTS

| | | | |
|---|---|---|---|
| 2,933,337 | 4/1960 | Katz | 417/76 |
| 3,370,423 | 2/1968 | Vaughan | 417/76 |
| 3,551,073 | 12/1970 | Petrovits | 417/76 |
| 3,687,253 | 8/1972 | Bjorklund | 192/113 B |
| 3,882,930 | 5/1975 | Schexnayder | 417/186 |
| 4,009,972 | 3/1977 | Sarle | 417/407 |
| 4,046,315 | 9/1977 | Klingenberg et al. | 417/151 X |
| 4,128,140 | 12/1978 | Riches | 184/1.5 |

Primary Examiner—George H. Krizmanich
Attorney, Agent, or Firm—Herbert C. Schulze

[57] ABSTRACT

This is a high-velocity scavenge pump and spray nozzle arrangement utilized for spraying oil onto an oil spray type clutch utilized in vehicles such as industrial trucks and the like. It is characterized by the utilization of the return fluid from an hydraulic device, such as a power steering motor, wherein a velocity block is utilized with a suction line scavenging oil from the crankcase and utilizing the oil scavenged from the return line for the clutch spray, returning the excess from the suction line to the hydraulic fluid tank which supplies the power device concerned.

10 Claims, 7 Drawing Figures

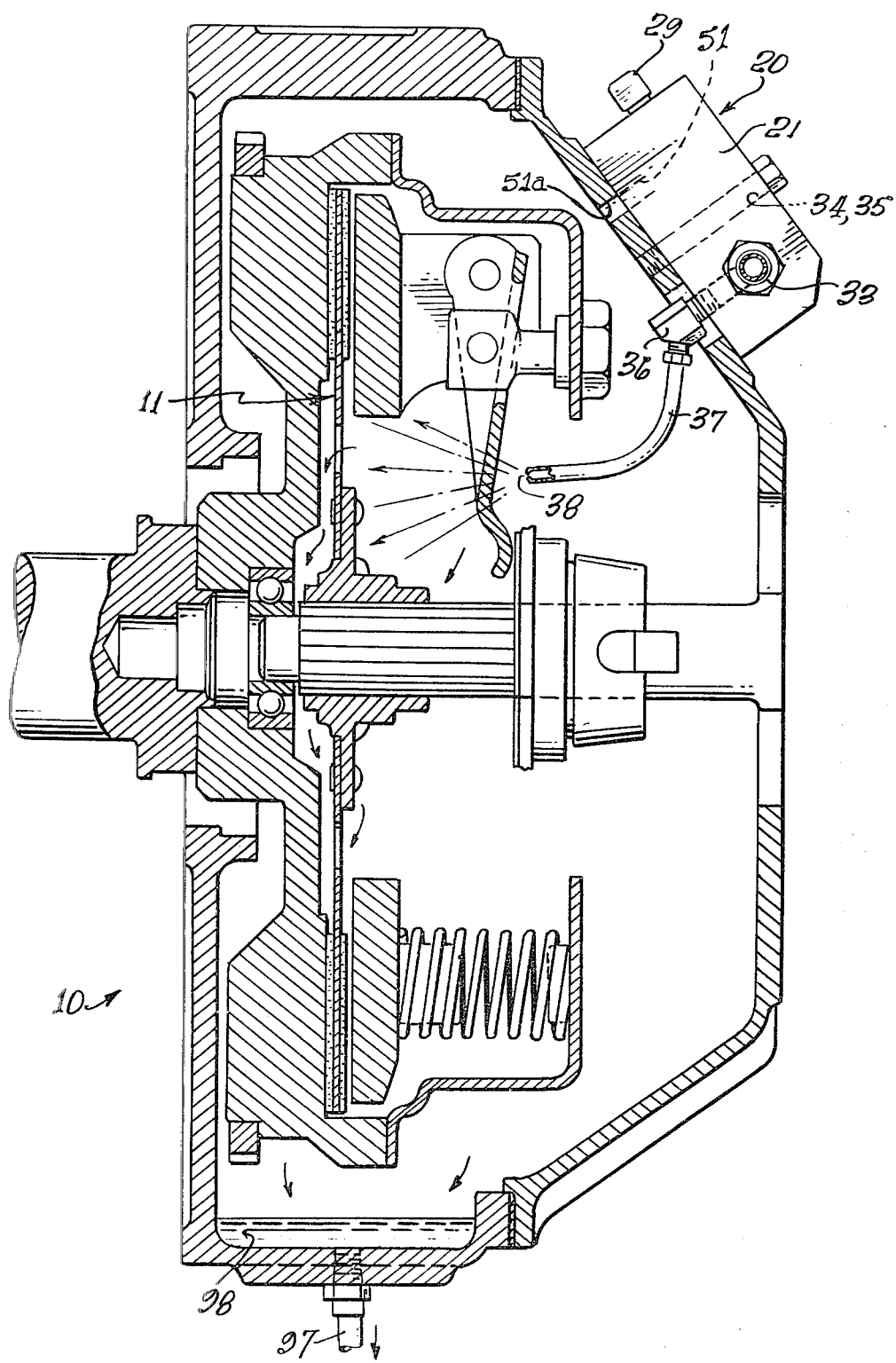

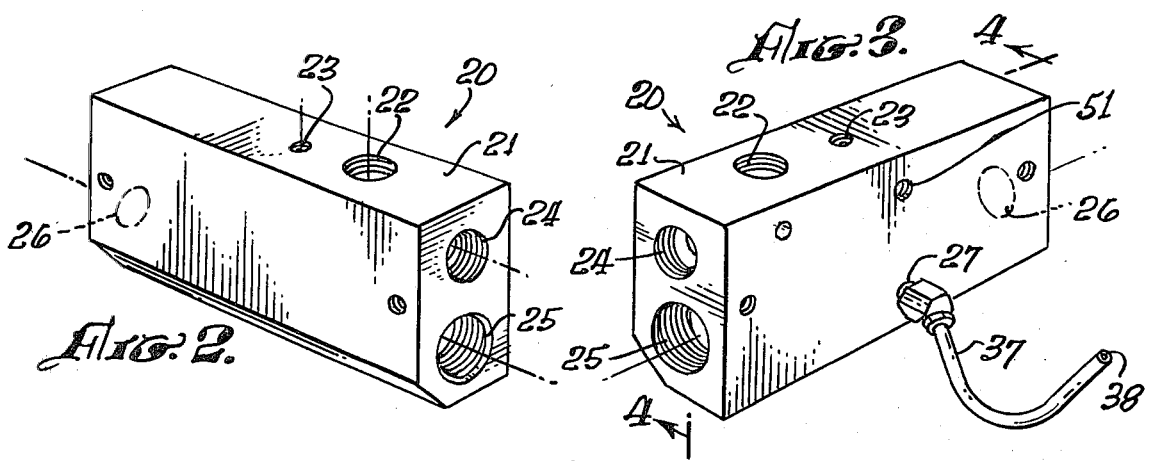
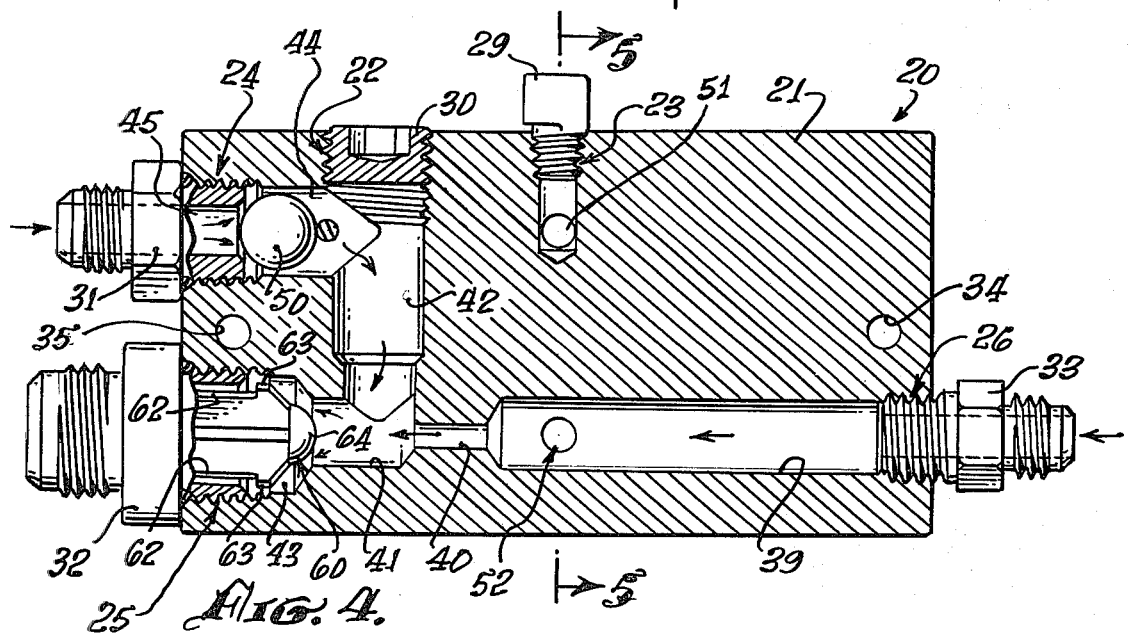
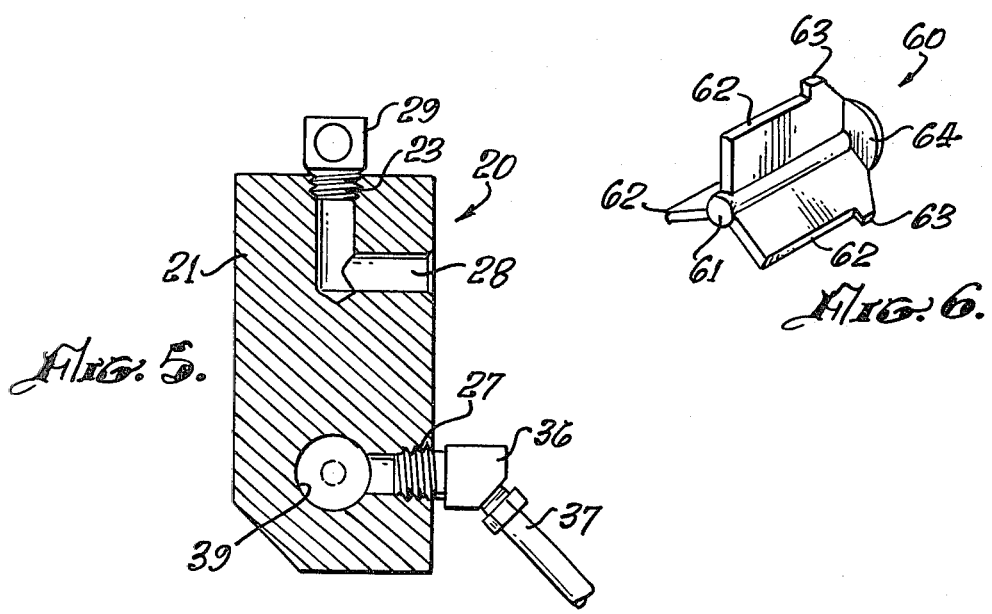

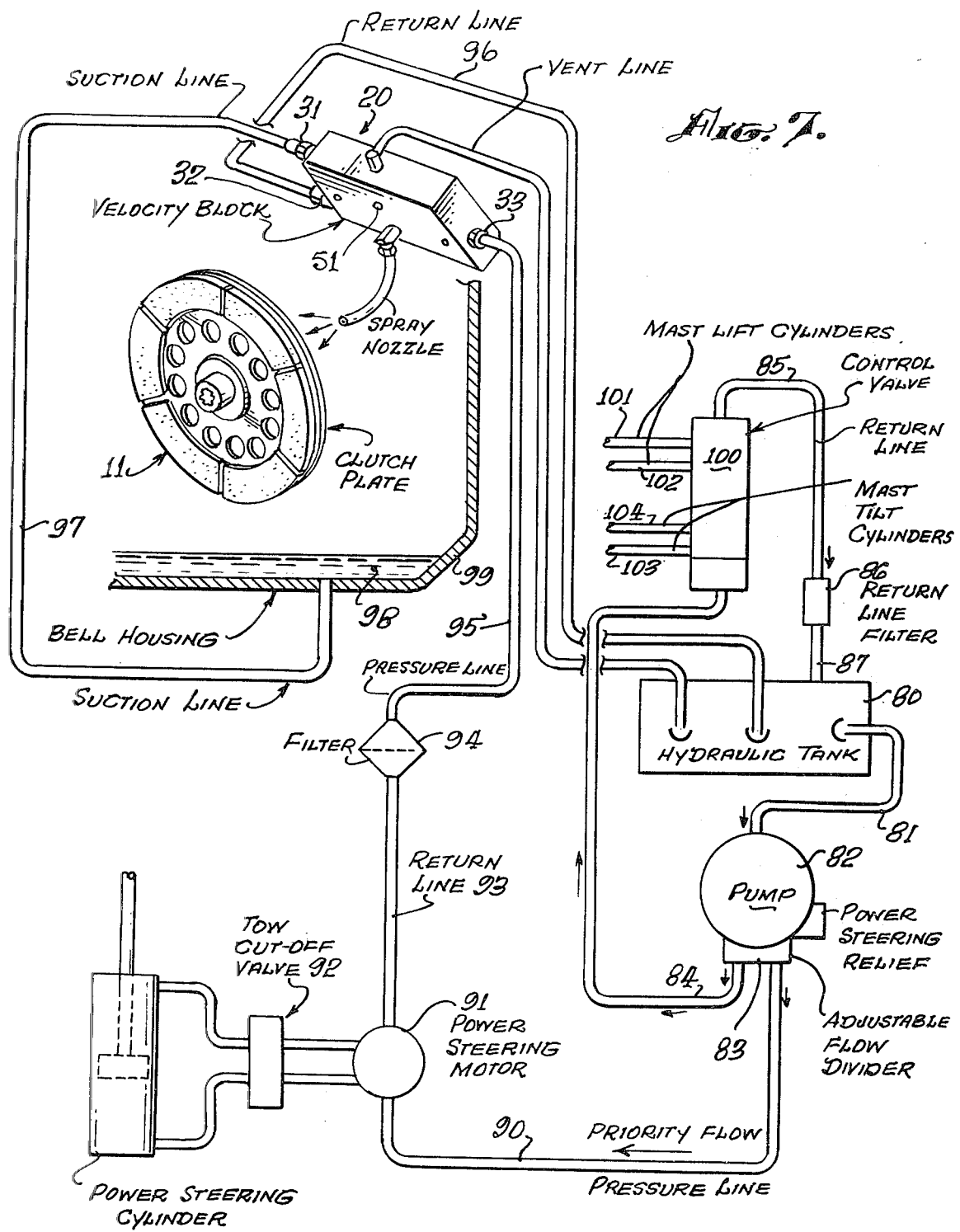

SCAVENGE PUMP

BACKGROUND OF THE INVENTION

1. Field of the Invention

This invention is in the general field of fluid pumping devices, and is more particularly directed to an hydraulic fluid scavenging pump, and is even more particularly directed to an hydraulic fluid scavenging pump wherein the pump is activated by a suction effect of oil being pumped over a cone assembly and wherein within the pump a portion of the fluid being used is sprayed back onto the clutch within the bell housing of the vehicle.

2. Description of the Prior Art

There are many pumps of different types utilized in hydraulic systems for purposes of moving hydraulic fluid from one location to the other. All of such pumps utilize active moving parts, such as turbines, or the like, for moving the oil.

The invention herein is distinct in that it uses the suction effect of pressure on the oil within a device I describe as a "velocity block" wherein suctions are created which remove the fluid from the crankcase of the vehicle and, at the same time, spray a portion of the fluid so removed directly onto an oil spray type clutch. The velocity block further removes all of the excess oil so being sprayed or other oils from the crankcase and returns them to the hydraulic fluid reservoir. It is unique in the combination of supplying a spray to the clutch as well as scavenging all of the fluid from the crankcase without the use of pumps having moving parts.

SUMMARY OF THE INVENTION

In automotive vehicles it is common to use oil spray type clutches such as the Lipe oil spray clutch type 12DO as manufactured by Lipe-Rollway Corporation. Such clutches and similar clutches are well known in the art.

In industrial vehicles or other vehicles it is also common to be required to remove the hydraulic fluid or oil utilized from the crankcase where it accumulates.

Customarily, the spraying of the oil and the removal is accomplished by pumps utilizing rotors, turbines, and the like, as are well known in the art. This creates additional moving parts with additional potential for failure, and does not contribute to the best maintenance of the vehicles.

If a pump providing fluid to an oil spray type clutch fails, severe damage can result. Likewise, if a pump removing fluid should fail, serious results can exist.

I have studied this situation and have devised a very effective suction pump which operates from the effect of the return line of fluid from an operating hydraulic unit wherein the fluid from such unit creates a suction within a special device I call a "velocity block" and actually sucks all of the oil from the crankcase. At the same time, and within the same device, a portion of the oil being utilized is directed to the clutch plate by a spray nozzle interconnecting with the velocity block.

In this manner I am able to provide the required oil spray for the clutch and simultaneously drain the fluid from the crankcase as well as to return all fluid to the hydraulic fluid reservoir.

It is an object of this invention to provide an oil pump for scavenging oil from a crankcase, or the like, wherein no moving parts are involved.

Another object of this invention is to provide such a pump as described wherein the activation is by suction resulting from a spray of oil within a velocity block over a cone having an opening through its center which creates a suction action.

Another object of this invention is to provide such a scavenging pump as described wherein there is interconnected to said apparatus a means for spraying fluid passing through the pump onto an auxiliary device such as a clutch plate.

The foregoing and other objects and advantages will become apparent to those skilled in the art upon reading the description of a preferred embodiment which follows in conjunction with a review of the appended drawings.

BRIEF DESCRIPTION OF THE DRAWINGS

FIG. 1 is a partially sectionalized view of a vehicle bell housing and crankcase wherein a preferred embodiment of this invention has been mounted in such manner as to scavenge the oil from the crankcase and to spray oil upon an oil spray type clutch;

FIG. 2 is a perspective view from the rear and one side of the pump utilized in FIG. 2;

FIG. 3 is a perspective view from the rear and the other side of the apparatus of FIG. 2;

FIG. 4 is a section on 4—4 of FIG. 3, with certain fittings inserted which are not shown in FIGS. 2 and 3;

FIG. 5 is a section on 5—5 of FIG. 4;

FIG. 6 is a perspective view of the cone utilized to create suction in the device; and FIG. 7 is a schematic view of a preferred embodiment of this invention showing its interconnection with other elements of an industrial type truck, in this case a lift truck.

DESCRIPTION OF A PREFERRED EMBODIMENT

FIG. 1 illustrates a bell housing, generally 10, having a clutch plate of the oil spray type 11 and utilizing a preferred embodiment of an apparatus of this invention 20. Fluid within the crankcase is shown at 98, and the return line for the fluid is shown at 97.

FIGS. 2 and 3 illustrate a preferred embodiment of a velocity block which is the housing for interior passageways by which a satisfactory and thoroughly effective apparatus is developed for the method of this invention. The block, generally 20, consists of a block of metal 21 having threaded openings 22, 23, 24, 25, 26, and 27 which interconnect with passageways within the block which will be described in connection with FIGS. 4 and 5.

Also, there are appropriate holes for bolts, or the like to fasten the device in place. The oil spray line 37 is also shown, which line has an opening 38 for expelling the oil used in the clutch spray. A connection such as the elbow arrangement 36 can be utilized for interconnection to the block 20.

The sectional view FIG. 4 shows oil passageway 39 which receives the oil or hydraulic fluid from the return of a power steering unit, or the like, through fitting 33 connected to the opening 26. Passageway 39 has an opening at 52 which interconnects with the threadedd opening 27 to supply the oil spray line.

A Venturi-like passageway 40 is provided for purpose of increasing the velocity of the oil entering from passageway 39. The larger passageway at 41 causes a Venturi-like effect and, as it impinges upon the cone 60, it creates additional suction through the passageway 42.

The suction being created in this area and the increased velocity passes around the fins 62 of the cone 64, as will be understood by those skilled in the art, and returns through fitting 32 fastened into opening 25 onto and into piping interconnecting with the hydraulic tank, as will be understood by a review of FIG. 7.

The fluid 98 in the crankcase passes through the line 97 and into fitting 45 connected to opening 24.

A ball 50 creates a check valve within the chamber 44, as will be clear to those skilled in the art. Thus, if there should be any back pressure, the fluid will not pass in the wrong direction through line 97.

The plug 30 is utilized to close the opening 22 which serves the dual function of having been required in a simple drilling operation to form the passage 42 as well as to provide a cleaning opening.

A vent line has been provided interconnected with the hydraulic tank so as to vent any noxious fumes from the crankcase. The vent line interconnects through fitting 29 and to the opening 51 which is adjacent the crankcase in such manner as to interconnect therewith through crankcase hole 51a.

The tabs 63 on the fins 62 of the cone member are for the purpose of seating within the area indicated as shown particularly well in FIG. 4.

The action of the device is well illustrated when one understands that during operation the return fluid from the power steering motor is being utilized and enters the block through fitting 33 where its velocity is increased through the Venturi-like arrangement.

An examination of FIG. 7 will clearly illustrate the entire operation when utilized in a lift truck. The power steering arrangement, generally 92, will be understood by those skilled in the art. Power steering motor 91 receives oil through line 90 from the pump 82 through an adjustable flow divider 83. The other portion of the fluid travels through line 84 to lift mast cylinders on a lift truck and through the various lines 103, 104, and the like, for tilt, and the like, which is unnecessary to describe in detail. The lift mast cylinders can be imagined at 100, with a return line 85 into a return line filter 86, and the fluid returns to the hydraulic tank through line 87. The hydraulic tank 80 maintains the fluid utilized and it passes initially in use through line 81 to the pump 82.

After leaving the power steering motor 91, the fluid returns through line 93 to filter 94, and through line 95 to interconnection with the velocity block, as has already been described. The suction line 97 takes the oil 98 from the bell housing 99 and returns it through fitting 31 into the velocity block. The return line 96 returns the fluid to the hydraulic tank, and the vent line returns fumes to the hydraulic tank.

The spray nozzle activates during the entire time the apparatus is operating and sprays the fluid upon the clutch plate.

While the embodiment of this invention specifically shown and described is fully capable of achieving the objects and advantages described, it is to be understood that such embodiment is for purposes of illustration only, and not for purposes of limitation.

I claim:

1. The method for removing oil from the crankcase of a vehicle comprising: (1) passing oil from an hydraulically operated apparatus cooperative with said vehicle through a device for increasing velocity and creating suction within a chamber; (2) connecting said chamber to said crankcase in such manner that the oil in the crankcase is drawn into the chamber by reason of the suction in the chamber; and (3) passing the oil from said chamber and said hydraulically operated apparatus into an oil reservoir.

2. The method of claim 1 wherein a portion of the oil is diverted from the suction device for an auxiliary use.

3. The method of claim 2 wherein the auxiliary use is for oil in connection with a clutch.

4. The method of claim 3 wherein the oil is sprayed on an oil spray type clutch.

5. The method of claim 4 wherein the device for increasing velocity includes a Venturi means.

6. The method of claim 5 wherein the velocity of the oil is increased by means of a Venturi device and suction is created by spraying over a dome-like suction element.

7. Apparatus for removing a fluid from an original location comprising: (1) means for increasing the velocity of a fluid and creating a suction within a chamber; (2) means connecting said chamber with a source of fluid; (3) means connecting said chamber to the fluid which is to be removed; (4) first means for removing fluid from said chamber; and (5) auxiliary means for allowing a portion of the fluid to be removed from the velocity increasing means for auxiliary use.

8. The apparatus of claim 7 wherein the auxiliary means includes a spray nozzle suitable to spray oil upon a clutch plate.

9. The apparatus of claim 8 wherein the means for increasing the velocity of the fluid includes Venturi means.

10. The apparatus of claim 9 wherein the means for creating a suction includes a dome-shaped element having an opening axially directed therethrough.

* * * * *